United States Patent [19]

Hooley

[11] Patent Number: 4,725,822
[45] Date of Patent: Feb. 16, 1988

[54] SHOPPING CART WITH LOWER TRAY SIGNALLING DEVICE

[76] Inventor: Charles M. Hooley, 920 S. Greeley St., Stillwater, Minn. 55082

[21] Appl. No.: 645,056

[22] Filed: Aug. 28, 1984

[51] Int. Cl.⁴ ............................................. G08B 13/14
[52] U.S. Cl. ...................................... 340/568; 186/62
[58] Field of Search ................ 340/568; 280/33.99 C, 280/33.99 A, DIG. 4; 186/62; 180/273

[56] References Cited

U.S. PATENT DOCUMENTS

| | | | |
|---|---|---|---|
| 3,457,423 | 7/1969 | Gravely | 186/62 X |
| 3,725,894 | 4/1973 | Geisler | 340/568 |
| 3,909,034 | 9/1975 | Trubiano | 280/DIG. 4 |
| 4,327,819 | 4/1982 | Coutta | 186/62 |
| 4,338,594 | 7/1982 | Holm | 340/568 |

Primary Examiner—James L. Rowland
Assistant Examiner—Jeffery A. Hofsass
Attorney, Agent, or Firm—Moore & Hansen

[57] ABSTRACT

A system for detecting the presence of a load on the lower tray of a shopping cart comprising a shopping cart with a lower tray movable between an upper and a lower position, a signal reflector connected to the lower tray and a detection device for detecting when the lower tray is in the lower position.

6 Claims, 8 Drawing Figures

SHOPPING CART WITH LOWER TRAY SIGNALLING DEVICE

BACKGROUND OF THE INVENTION

The present invention relates generally to an improved shopping cart system and more particularly to a shopping cart detection system having a signalling device for signalling the presence of a load on the lower tray or shelf of the shopping cart.

One problem which grocery stores, discount stores, etc. have experienced throughout the years, particularly stores where the customers are allowed to wheel the shopping cart out into the parking lot with the merchandise or groceries he or she has purchased, is the failure to charge the customer for items placed on the lower tray or shelf of the shopping cart. These items are often missed by the checkout clerk since his or her view of the lower tray is often obstructed as the cart is pushed through the checkout aisle. It has been found that even if the checkout clerk is told to specifically check each cart to make sure that there are no items on the lower shelf which have not been accounted for, he or she often forgets to do this, particularly during busy hours. As a result, the shopping cart is pushed through the checkout station and then either wheeled out to the parking lot and unloaded by the customer or by a carryout person on the assumption that the items have been paid for.

This problem has previously been recognized by others. For example, U.S. Pat. No. 2,918,294 granted to Hennion discloses a shopping cart with means for indicating when the lower tray or basket is loaded with merchandise. This device includes an indicating means connected with the basket portion of the cart and a cable element which is connected with a portion of the cart and is movable between an upper and a lower position in response to a portion of the movement of the lower tray about a forward pivot point. In this device, there is no direct connection between the cable and the lower tray. Rather, these two elements operate independently of one another. Thus, two spring members are necessary: one spring to retain the lower tray in a normally raise position and a second spring to maintain the cable element in a normally raised position. This results in a structure which is quite complicated and is not readily adaptable as a retrofit item.

U.S. Pat. No. 3,051,936 granted to Finger et al. discloses an alarm system for a shopping cart. This alarm indicates the presence of a load on the lower shelf of the cart by completing a circuit when the cart is wheeled through the checkout aisle. This device is also quite complicated structurally and is also not readily adaptable as a retrofit item. Further, it requires the installation of contact strips in the checkout aisles to facilitate completion of the electrical circuit, an installation which is unattractive and also expensive.

Others have also recognized the problem resulting from the failure to account for and charge customers for items placed on the lower shelf of shopping carts, however, the devices described in the prior art have not eliminated the problem. Although these devices may function satisfactorily in certain applications, they appear to have limitations. For example, most are relatively complicated structures which appear to be designed for a special type of shopping cart with limited flexibility for retrofitting on shopping carts already in use. Accordingly, a need continues to exist for a shopping cart with an improved means for signalling the presence of a load on the lower shelf of the cart which is simple in construction, which is unobvious to the customer and which can be easily retrofitted on shopping carts presently in use.

SUMMARY OF THE INVENTION

In contrast to the prior art, the present invention provides a detection system comprising a shopping cart with an improved means for signalling the presence of the load on the lower tray of the cart. This means is embodied in a relatively uncomplicated structure and is capable of quick and efficient retrofitting with respect to existing shopping carts.

More specifically, the shopping cart used in the system of the present invention includes a frame, an upper basket secured to and supported by the frame and a lower tray positioned below the basket and being pivotally secured near one of its ends to a lower frame member. This pivotal connection permits pivotal movement of the lower tray between a lower position in which the tray rests on a portion of the cart frame and an upper position. Means are also provided for maintaining this lower tray in its upper position when the lower tray is unloaded. In the preferred embodiment, this means includes a spring means positioned near the pivot point of the lower tray to bias the lower tray toward its upper position.

The system also includes improved signalling means for indicating the presence of a load on the lower tray. This signalling means includes a photoelectric cell having means for emitting and receiving a light source, a signalling element for indicating when a load is on the lower tray and a means for resetting the photoelectric cell. Reflector means are also provided on the shopping cart in cooperation with the light emitting and receiving means to activate the signalling element when there is a load on the lower tray and to avoid activation when there is no load on the lower tray. This reflector means is positioned on the lower tray of the shopping cart so that it is movable, with the lower tray, between a lower position when a load is on the lower tray and an upper position when the lower tray is unloaded.

In the preferred embodiment of the present invention, the light emitting and receiving means of the photoelectric cell is positioned in the checkout aisle at a supermarket or other store at a height which corresponds to the height of the reflector when the lower tray is loaded. Thus, as the shopping cart is wheeled through the checkout aisle, the signal means on the photoelectric cell will be activated. If no load is on the lower tray, the cell will not be activated.

Accordingly, it is an object of the present invention to provide an improved shopping cart system with a signalling means for signalling the presence of a load on the lower tray of the cart.

Another object of the present invention is to provide a shopping cart system with means for electronically signalling a load on the lower tray of the cart which includes a photoelectric cell associated with the checkout counter and means for detecting whether the lower tray is in a lowered, loaded position or an upper, unloaded position.

Another object of the present invention is to provide a signalling means which is relatively inexpensive and can be easily and efficiently retrofitted with respect to existing shopping carts for signalling a load on the lower tray of the cart.

These and other objects of the present invention will become apparent with reference to the drawings, the description of the preferred embodiment and the appended claims.

DESCRIPTION OF THE PREFERRED EMBODIMENT

Figure 1:
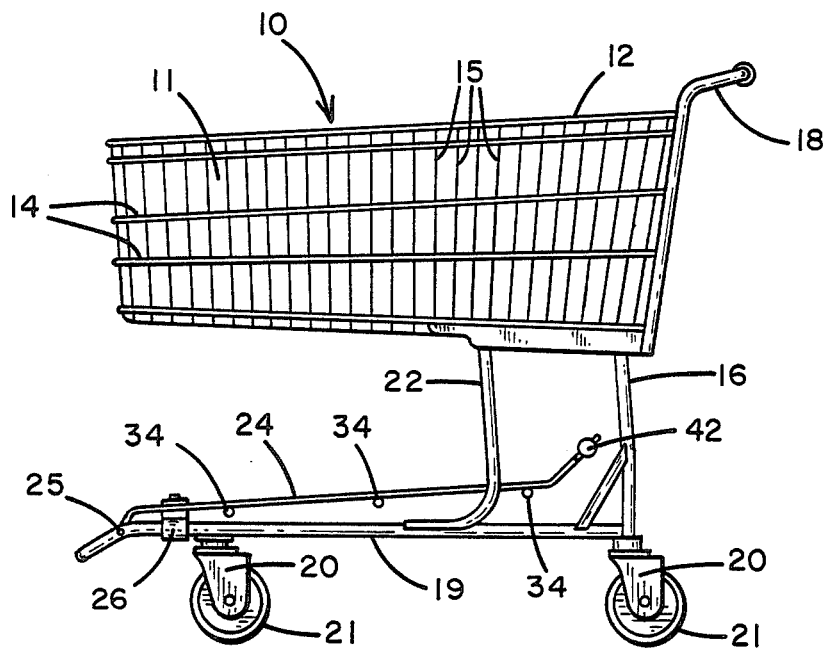
FIG. 1 is a side, elevational view of a shopping cart in accordance with the present invention.
Figure 3:
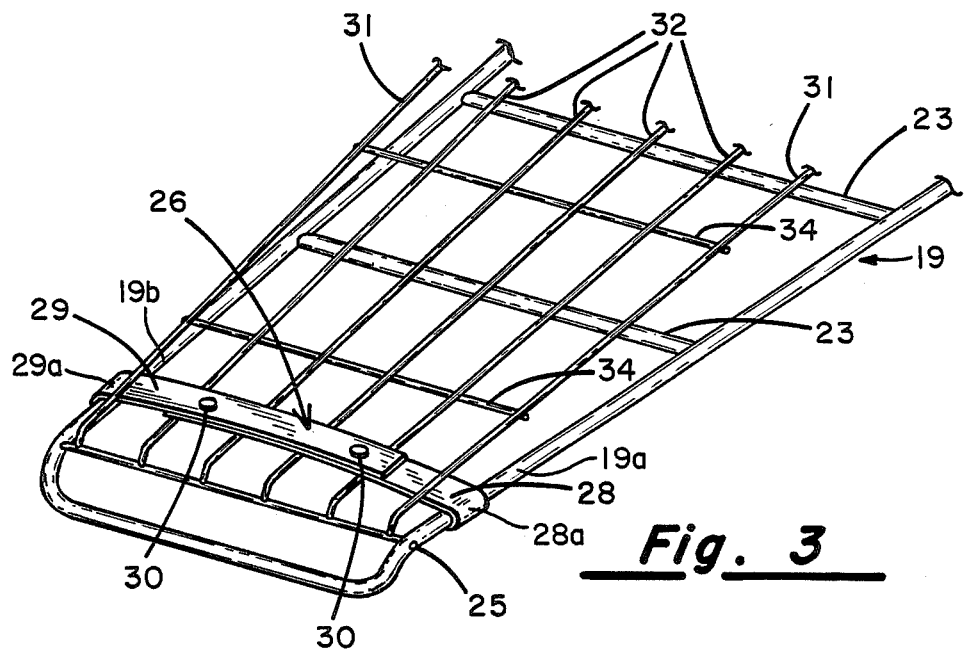
FIG. 3 is an enlarged, pictorial view of a portion of the shopping cart frame and the lower tray showing the spring means for maintaining the lower tray biased toward an upper position.

Reference is first made to FIG. 1 showing a shopping cart designated generally by the reference numeral 10 with the signalling means of the present invention associated with it. The shopping cart 10 includes a plurality of elongated frame members including a bottom frame member 19, a rearward, generally vertically extending frame member 16 and an intermediate, generally vertically extending frame member 22. As shown in FIG. 3, a plurality of cross brace members 23 extend between horizontal beams 19a and 19b defining edges of the frame member 19. The frame member 19 comprises a pair of horizontally spaced frame side sections. The cart 10 also includes an upper basket 11 secured to and supported by portions of the frame members 16 and 22. The basket is constructed of a plurality of spaced, generally horizontally disposed wire members 14 and a plurality of generally vertically disposed wire members 15 interconnected with the members 14. A top wire frame member 12 defines the upper edge of the basket 11. A handle 18 is connected with the basket 11 for pushing the cart. The entire shopping cart is supported by four caster wheel assemblies which are connected with the frame member 19. Only two of the caster wheel assemblies are illustrated in FIG. 1. Each of these assemblies includes a pivotal caster element 20 and a rotatably mounted wheel 21.

The shopping cart also includes a lower tray or shelf 24 which is pivotally secured near one of its ends to the spaced frame side sections of the frame member 19. In the preferred embodiment, the lower tray or shelf 24 is pivotally secured at the point 25 near its forward end.

Figure 4:
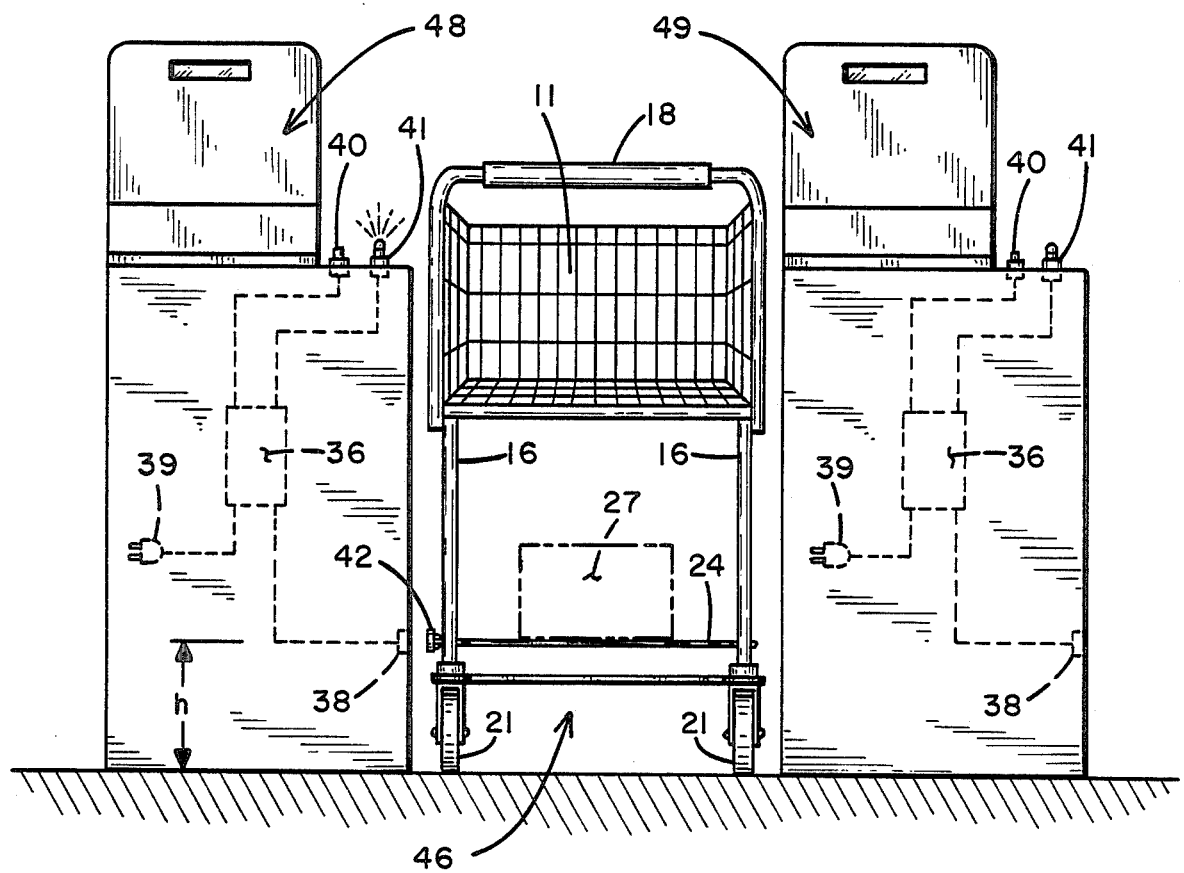
FIG. 4 is a elevational, front view of a checkout aisle showing the photoelectric cell, the auxiliary structure connected with the checkout counter and a loaded shopping cart in the aisle.
Figure 5:
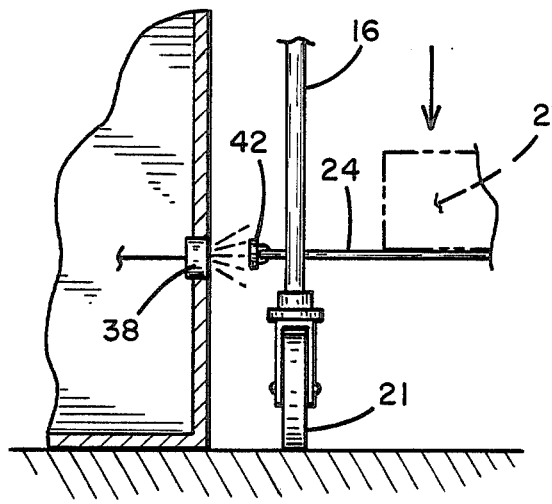
FIG. 5 is an enlarged elevational view showing the light emitting and receiving element and reflector element when the lower tray is positioned in a loaded or lower position.
Figure 6:
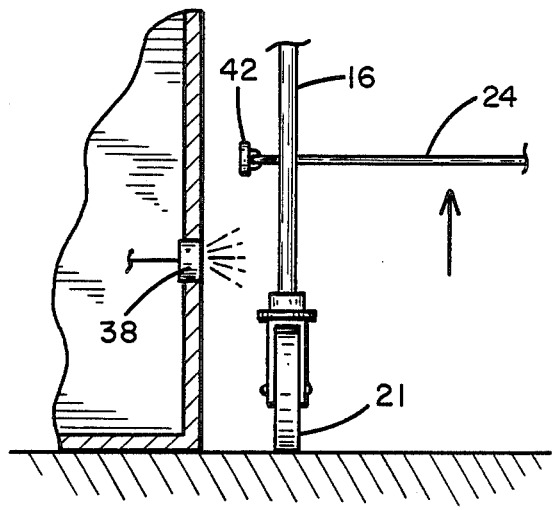
FIG. 6 is an enlarged elevational view showing the light emitting and receiving element and the reflector element when the lower tray is positioned in its unloaded, upper position.

As illustrated in FIG. 3, the lower tray 24 is comprised of a pair of rearwardly extending edge wire members 31, 31 and a plurality of rearwardly extending intermediate wire members 32. These wire members 31 and 32 are supported and held together by a plurality of cross brace members 34. Associated with the lower tray 24 near its pivot point 25 is a spring means which functions to bias the lower shelf 24 upwardly about its pivot point 25. Thus, when the lower shelf 24 is unloaded, the spring means 26 will cause the lower shelf 24 to be pivoted upwardly toward its upper position as illustrated in FIGS. 1 and 6. When a load such as a package of food or other item is placed on the lower shelf as illustrated in FIGS. 4 and 5, the lower tray 24 will pivot downwardly against the force of the spring 24 to a lower position in which the lower tray is supported by a portion of the cross brace members 23.

Figure 8:
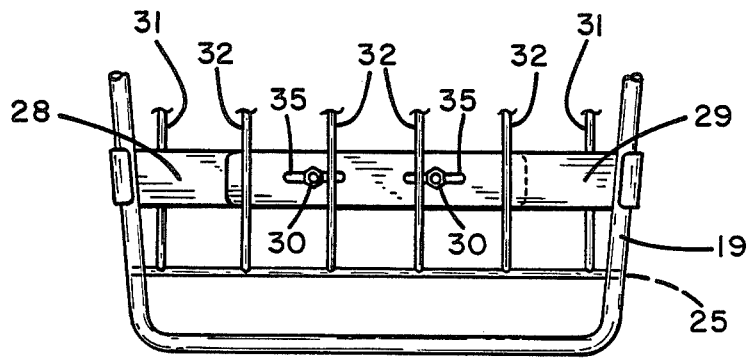
FIG. 8 is an elevational bottom view of a portion of the lower tray showing connection between the lower frame and the spring means for biasing the lower tray toward an upper position.

As shown in FIGS. 1, 3 and 8, the spring means 26 is comprised of a pair of spring members 28 and 29 which span the between the horizontal beams 19a, 19b of the lower frame 19 and are connected with the lower tray 24 to bias the same toward an upper position. The members 28 and 29 are elongated pieces of spring metal with a hook or curved portion 28a and 29a, respectively, at one end to connect with opposing edges of the lower frame 19. Each of the members 28 and 29 also includes a pair of holes or openings which are aligned to permit the two members 28 and 29 to be joined together with a pair of connecting elements 30, 30 such as a screw, rivet, or bolt. At least one of the members 28 and 29 includes a pair of elongated openings 35, 35 to allow length adjustment of the spring 26. This enables the spring 26 to fit shopping carts of various widths. In the preferred embodiment, the spring is disposed above the intermediate wire members 32 and below the edge wire members 31. With this arrangement, the rigidity of the spring 26 causes the lower tray 24 to be biased upwardly when the tray 24 is unloaded. When a load is placed on the tray 24, the weight of the load acts against the spring 26 to move the tray 24 downwardly against the cross brace members 23.

It is also contemplated, however, that various other spring mechanisms can be utilized. For example, a conventional scissor spring or pair of scissor springs can be connected between the lower tray 24 and the frame 19 to maintain the tray 24 in a raised position when it is unloaded. A further embodiment contemplates a compression spring disposed between a lower portion of the tray 24 and a portion of the frame 19 or a support member bridging the edges of the frame 19.

The present invention also includes a signalling system associated with the shopping cart and with the checkout aisle to indicate the presence of a load 27 on the lower tray 24. In the preferred embodiment, this signalling system includes the photoelectric cell together with its various auxiliary elements illustrated in FIG. 2. The system is capable of sensing the presence or absence of a load on the lower tray 24 of the shopping cart 10 by sensing the position of the lower tray 24. If there is a load 27 on the tray 24, a signalling element is activated.

Figure 2:
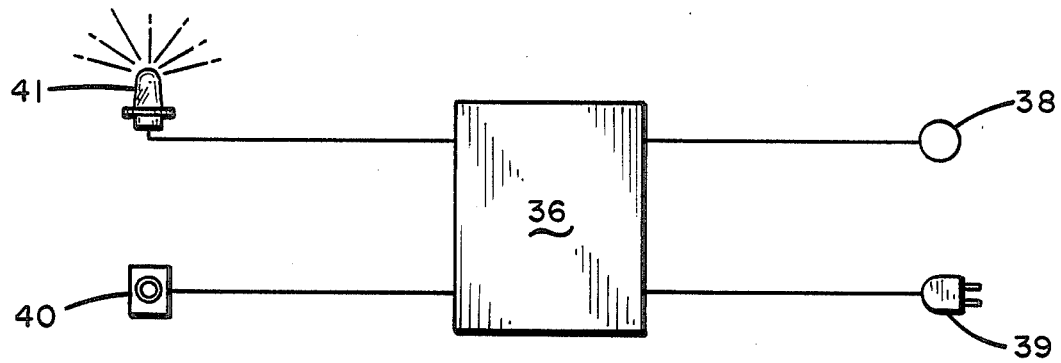
FIG. 2 is a schematic diagram of the photoelectric cell and auxiliary structure.

As illustrated in FIG. 2, the photoelectric cell 36 includes a light emitting and receiving element 38. This element 38 comprises means for emitting a beam of light or light signal and also means for receiving such beam of light or light signal or a reflection of it. The circuitry in the photoelectric cell 36 and the light emitting/receiving element 38 is such that if the light which is emitted from the element 38 is reflected back and received by the element 38, a circuit in the photoelectric cell is activated to thereby in turn activate a signalling element 41. In the preferred embodiment, this signalling element 41 is a light, however, it is possible that this signalling element could also be a buzzer or other audio or visual signal. The cell 36 also includes a reset means or button 40 for resetting the system after it has been activated. For example, the element 41 is activated during use when light being emitted from the element 38 is reflected back and received by the receiving portion of the element 38. The signalling element can be deactivated and the system reset for further operation by depressing the button 40. The cell 36 also includes a plug 39 for supplying electric power to the cell 36.

Photoelectric cells are common in the prior art. Accordingly, there are a number of such photoelectric cells presently available which will function acceptably in the system of the present invention. One such cell which is illustrated in the preferred embodiment and is identified by the trademark PLUG-MATE is manufactured by Tri-Tronics, Inc. of Tampa, Fla. This particular photoelectric cell of the preferred embodiment is identified by Model No. PM-7009 TRY.

Figure 7:
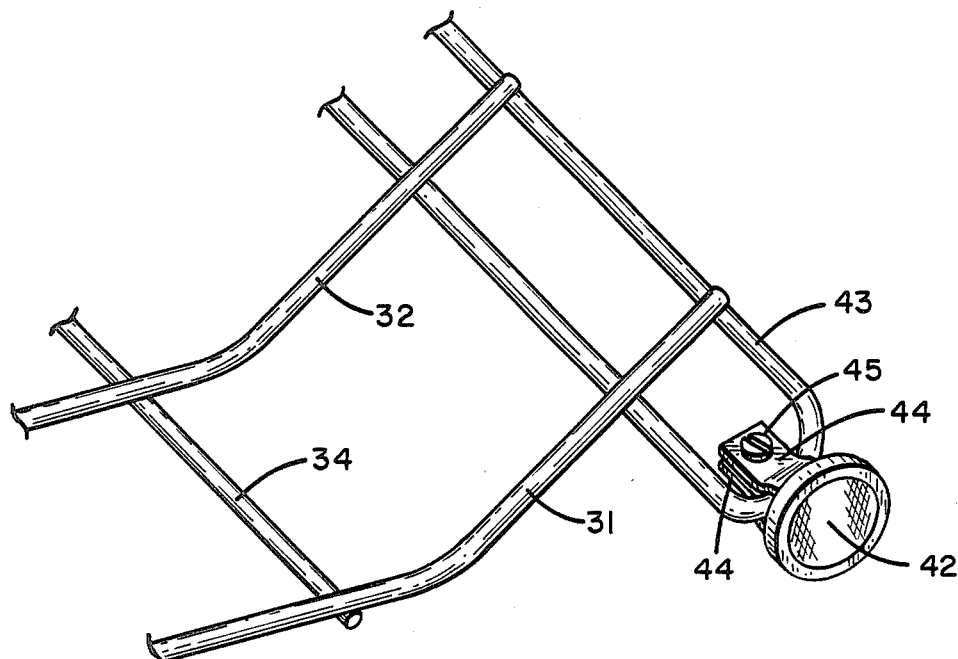
FIG. 7 is a pictorial view showing the connection between the reflector element and the lower tray.

Associated with the lower tray 24 of the shopping cart 10 at a point spaced from the pivot point 25 is a mirror or reflector element 42. In the preferred embodiment, as illustrated best in FIGS. 1 and 7, the reflector element 42 is connected with a rearward end 43 of the lower tray 24. The reflector 42 includes a pair of spaced connecting brackets 44, 44 which extend on opposite sides of a portion of the tray 24 and are secured together by a threaded member 45. The rearward end 43 of the tray 24 and the reflector 42 move upwardly and downwardly as the tray 24 is pivoted about its forward pivot point 25. It is contemplated that the reflector 42 could be a single surface mirror element or a multifaceted reflector as shown in the preferred embodiment.

FIG. 4 shows the assembly of the photoelectric cell 36 in relationship to a shopping cart 10 and a checkout aisle 46. Specifically, the photoelectric cell 36 is mounted at a checkout counter 48 with the light emitting and receiving element 38 positioned at a height "h" above the floor. This height "h" corresponds to the height of the reflector 42 mounted to the lower tray 24 when the lower tray 24 is in a loaded or lower position as illustrated in FIGS. 4 and 5. When in this position, light which is emitted from the element 38 is reflected by the reflector 42 back to the light receiving portion of the element 38, thus activating the signalling element 41. To deactivate the element 41, the reset button 40 is depressed. When the lower tray 24 is in an unloaded or upper position, the reflector is in the position illustrated in FIG. 6. In this position, the reflector is above the light emitting element 38, thus, it does not reflect the light back to the light receiving portion of the element 38. Accordingly, when there is no load on the lower tray 24 and the tray 24 is in its upper position, it simply passes the element 38 without activating the signalling element 41.

Accordingly, it can be seen that the system of the present invention for detecting the presence of a load 27 on the lower tray 24 of a shopping cart includes a shopping cart having a lower tray 24 which is pivotable about one of its ends between a lower or loaded position and an upper or unloaded position. Connected with this lower tray 24 is a mirror or reflecting element 42 which is spaced from the pivot point and which is also movable between a lower, loaded position and an upper, unloaded position. A spring means 26 is also connected with the lower tray 24 to bias the same upwardly when the tray 24 is unloaded. Associated with the shopping cart is a sensing and signalling means which includes a photoelectric cell 36 and various auxiliary elements including an element for emitting and receiving a light source 38, a signalling element 41, a reset means 40 and a power source 39. The photoelectric cell 36 is positioned behind a checkout counter 48 and 49 (FIG. 4) with the light emitting and sensing element 38 being located near the floor at a height "h" which corresponds to the height of the reflector 42 when the lower tray 24 is in its loaded or lower position. When the shopping cart passes through the checkout aisle 46 with the lower tray 24 in the loaded position, the light which is emitted from the element 38 will be reflected by the reflector element 42 back to the light receiving portion of the element 38, thus activating the light of the signalling means 41. This in turn informs the checkout person that the shopper has an item on the lower tray 24. The signalling means 41 can then be deactivated by pressing the reset button 40.

Although the description of the preferred embodiment has been quite specific, it is contemplated that various changes could be made without deviating from the spirit of the present invention. Accordingly, it is intended that the present invention be dictated by the appended claims rather than by the description of the preferred embodiment.

I claim:

1. Apparatus for detecting the presence of a load on the lower tray of a shopping cart as the shopping cart is wheeled through a check-out station, said apparatus comprising:

a shopping cart having a basket, a frame supporting said basket at an elevated level, and said frame being mounted on wheels, said frame having at least two generally horizontal side beams beneath said basket in generally parallel, spaced-apart relation to each other;

a lower tray supported on said frame between said side beams under said basket, said lower tray being comprised of a plurality of wire members extending longitudinally and transversely of said cart, and said lower tray being vertically pivotable about a horizontal axis located at the front end of said frame and extending generally transversely of said frame and of said horizontal beams, said tray being pivotally movable between a first, lowered position in response to the placing of a load of goods on said tray, and a second, elevated position which said tray assumes in the absence of a load;

spring means located at the front end of said frame in close proximity to said horizontal pivot axis and supported from said frame means in upwardly biasing engagement with the front end of said tray so as to normally urge said tray upwardly to said second position, said spring means comprising at least one leaf spring member interleaved between wire members of said tray at the front end of said cart.

signal means connected to said lower tray and movable therewith;

signal receiving means for receiving a signal transmitted from said signal means connected to said lower tray, said signal receiving means to be positioned at said checkout station to receive a signal transmitted from said signal means connected to said lower tray when said lower tray is in its first, lowered position; and indicating means responsive to said signal receiving means for indicating the movement of said lower tray to its first, lowered position.

2. The apparatus of claim 1, wherein said signal receiving means is a photoelectric cell.

3. The apparatus of claim 2, wherein said signal means is a reflector connected to said lower tray near its rearward end.

4. The apparatus of claim 1 wherein said leaf spring member is interleaved between said wire members extending longitudinally of said cart.

5. Apparatus for detecting the presence of a load on the lower tray of a shopping cart as the shopping cart is wheeled through a check-out station, said apparatus comprising;

a shopping cart having a basket, a frame supporting said basket at an elevated level, and said frame being mounted on wheels, said frame having at least two generally horizontal side beams beneath said basket in generally parallel, spaced-apart relation to each other;

a lower tray supported on said frame between said side beams under said basket and vertically pivotable about a horizontal axis located at the front end of said frame and extending generally transversely of said frame and of said horizontal beams, said tray being pivotally movable between a first, lowered position in response to the placing of a load of goods on said tray, and a second, elevated position which said tray assumes in the absence of a load, said tray having at least two generally parallel edge wire members and a plurality of generally parallel intermediate wire members between said edge wire members, said edge wire members and said intermediate wire members extending longitudinally from said pivotal axis and being rotatable about said axis;

spring means located at the front end of said frame in close proximity to said horizontal pivot axis and supported from said frame means in upwardly biasing engagement with the front end of said tray so as to normally urge said tray upwardly to said second position, said spring means having at least one leaf spring member interleaved between said intermediate wire members and said edge wire members;

signal means connected to said lower tray and movable therewith;

signal receiving means for receiving a signal transmitted from said signal means connected to said lower tray, said signal receiving means to be positioned at said checkout station to receive a signal transmitted from said signal means connected to said lower tray when said lower tray is in its first, lowered position; and indicating means responsive to said signal receiving means for indicating the movement of said lower tray to its first, lowered position.

6. Apparatus for detecting the presence of a load on the lower tray of a shopping cart as the shopping cart is wheeled through a check-out station, said apparatus comprising:

a shopping cart having a basket, a frame supporting said basket at an elevated level, and said frame being mounted on wheels, said frame having at least two generally horizontal side beams beneath said basket in generally parallel, spaced-apart relation to each other;

a lower tray supported on said frame between said side beams under said basket and vertically pivotable about a horizontal axis located at the front end of said frame and extending generally transversely of said frame and of said horizontal beams, said tray being pivotally movable between a first, lowered position in response to the placing of a load of goods on said tray, and a second, elevated position which said tray assumes in the absence of a load;

spring means located at the front end of said frame in close proximity to said horizontal pivot axis and supported from said frame means in upwardly biasing engagement with the front end of said tray so as to normally urge said tray upwardly to said second position, said spring means comprising an elongated leaf spring connected at its ends to said side beams and acting against said lower tray to bias the same uupwardly towards its second position, said elongated leaf spring being comprised of a pair of spring sections which are adjustably connected with each other to fit various sizes of shopping carts;

signal means connected to said lower tray and movable therewith;

signal receiving means for receiving a signal transmitted from said signal means connected to said lower tray, said signal receiving means to be positioned at said checkout station to receive a signal transmitted from said signal means connected to said lower tray when said lower tray is in its first, lowered position; and indicating means responsive to said signal receiving means for indicating the movement of said lower tray to its first, lowered position.

* * * * *